(12) United States Patent
Stubler et al.

(10) Patent No.: US 7,887,261 B2
(45) Date of Patent: Feb. 15, 2011

(54) METHOD FOR THE TRANSPORT OF A CIVIL ENGINEERING STRUCTURE IN AN AQUATIC MEDIUM

(75) Inventors: Jerome Stubler, Paris (FR); Jean-Daniel Lebon, Saint Germain en Laye (FR); Sebastien Petit, Paris (FR)

(73) Assignee: Soletanche Freyssinet, Rueil Malmaison (FR)

( * ) Notice: Subject to any disclaimer, the term of this patent is extended or adjusted under 35 U.S.C. 154(b) by 138 days.

(21) Appl. No.: 12/289,986

(22) Filed: Nov. 7, 2008

(65) Prior Publication Data

US 2009/0191002 A1    Jul. 30, 2009

(30) Foreign Application Priority Data

Nov. 9, 2007    (FR)    ................... 07 07881

(51) Int. Cl.
*B63B 35/40*    (2006.01)
(52) U.S. Cl. ............................ 405/209; 405/3; 405/205; 405/206; 405/203
(58) Field of Classification Search ................ 405/196, 405/200, 203, 205, 206, 207, 195.1, 3, 4, 405/7, 209
See application file for complete search history.

(56) References Cited

U.S. PATENT DOCUMENTS

| | | | | |
|---|---|---|---|---|
| 2,910,834 | A * | 11/1959 | Knapp | 405/206 |
| 4,055,264 | A | 10/1977 | Abbott | |
| 4,111,144 | A * | 9/1978 | Ingvason | 405/3 |
| 4,381,723 | A * | 5/1983 | Furst | 405/3 |
| 4,509,446 | A * | 4/1985 | Sutton | 405/3 |
| 4,556,004 | A | 12/1985 | Lamy et al. | |
| 4,648,751 | A * | 3/1987 | Coleman | 405/227 |
| 4,826,355 | A | 5/1989 | Marion | |
| 4,923,335 | A * | 5/1990 | Massoudi | 405/204 |
| 5,314,263 | A * | 5/1994 | Stokoe et al. | 405/3 |
| 5,403,124 | A | 4/1995 | Kocaman et al. | |
| 5,807,029 | A * | 9/1998 | Ellnor | 405/204 |
| 5,913,278 | A * | 6/1999 | Mitchell | 405/3 |
| 6,132,143 | A * | 10/2000 | Hovinga et al. | 405/206 |
| 6,171,028 | B1 * | 1/2001 | Van Gelder | 405/204 |
| 6,612,781 | B1 * | 9/2003 | Jackson | 405/205 |
| 6,736,571 | B2 * | 5/2004 | McCarthy et al. | 405/204 |
| 6,786,679 | B2 * | 9/2004 | Huang et al. | 405/205 |
| 2003/0108392 | A1 * | 6/2003 | McCarthy et al. | 405/206 |
| 2003/0192465 | A1 | 10/2003 | Roodenburg | |

(Continued)

FOREIGN PATENT DOCUMENTS

DE    10201040    7/2003

(Continued)

*Primary Examiner*—Frederick L Lagman
(74) *Attorney, Agent, or Firm*—McKenna Long & Aldridge LLP

(57) ABSTRACT

The invention provides a method for the transport of a civil engineering structure in an aquatic medium. According to this method: at least one float is associated with the civil engineering structure in such a way as to ensure that the said civil engineering structure floats stably in an aquatic medium, the said float surrounding the civil engineering structure and a bottom portion of the civil engineering structure extending below the said float, and the civil engineering structure and the associated float are caused to move in the aquatic medium to a desired position.

20 Claims, 8 Drawing Sheets

U.S. PATENT DOCUMENTS

2008/0240864 A1 * 10/2008 Belinsky .................... 405/205

FOREIGN PATENT DOCUMENTS

| | | |
|---|---|---|
| FR | 2887900 | 1/2007 |
| GB | 2231843 | 11/1990 |
| GB | 2327449 | 1/1999 |
| WO | WO 00/75009 A1 | 12/2000 |
| WO | WO 2005/123499 A1 | 12/2005 |

* cited by examiner

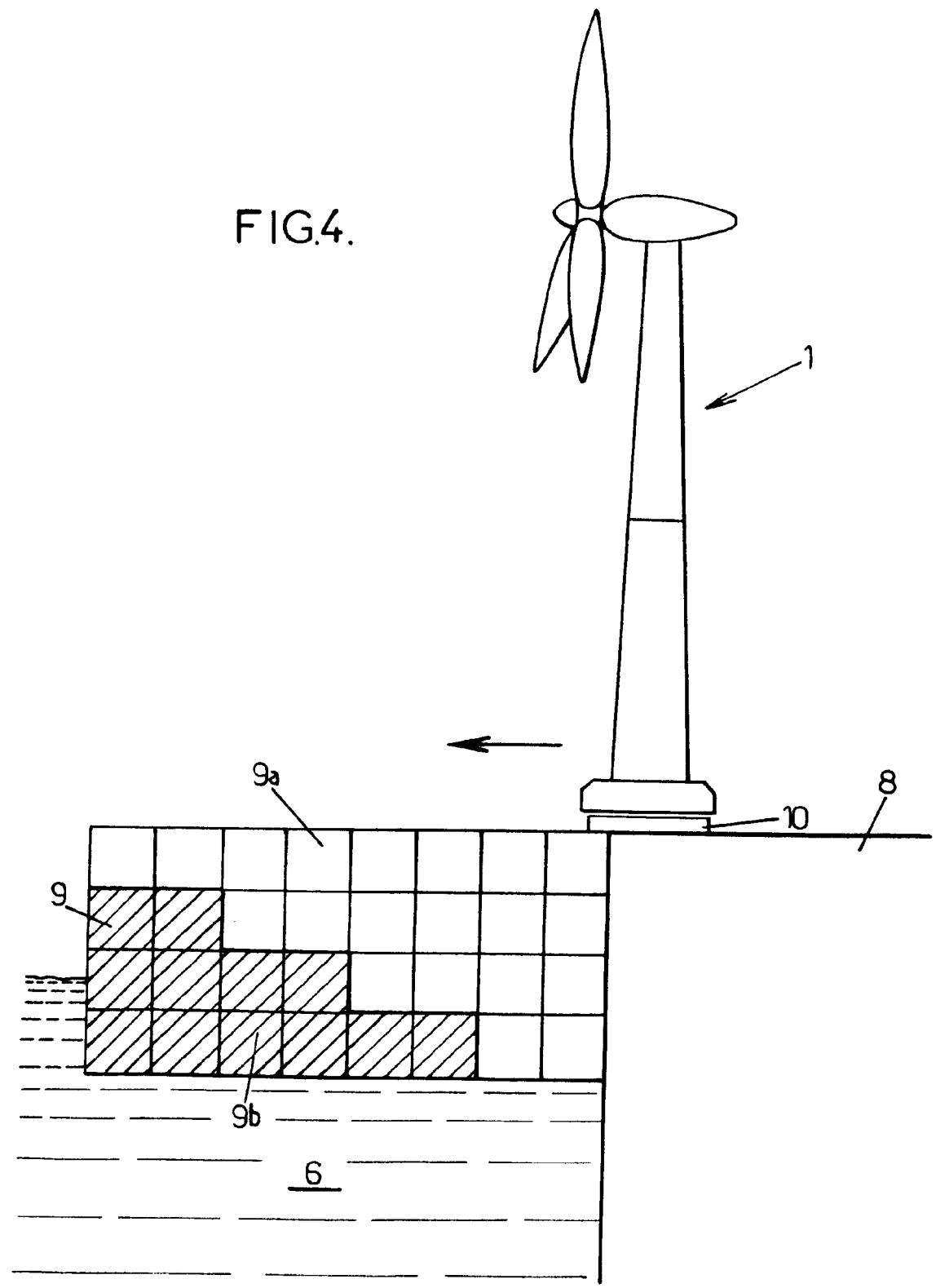

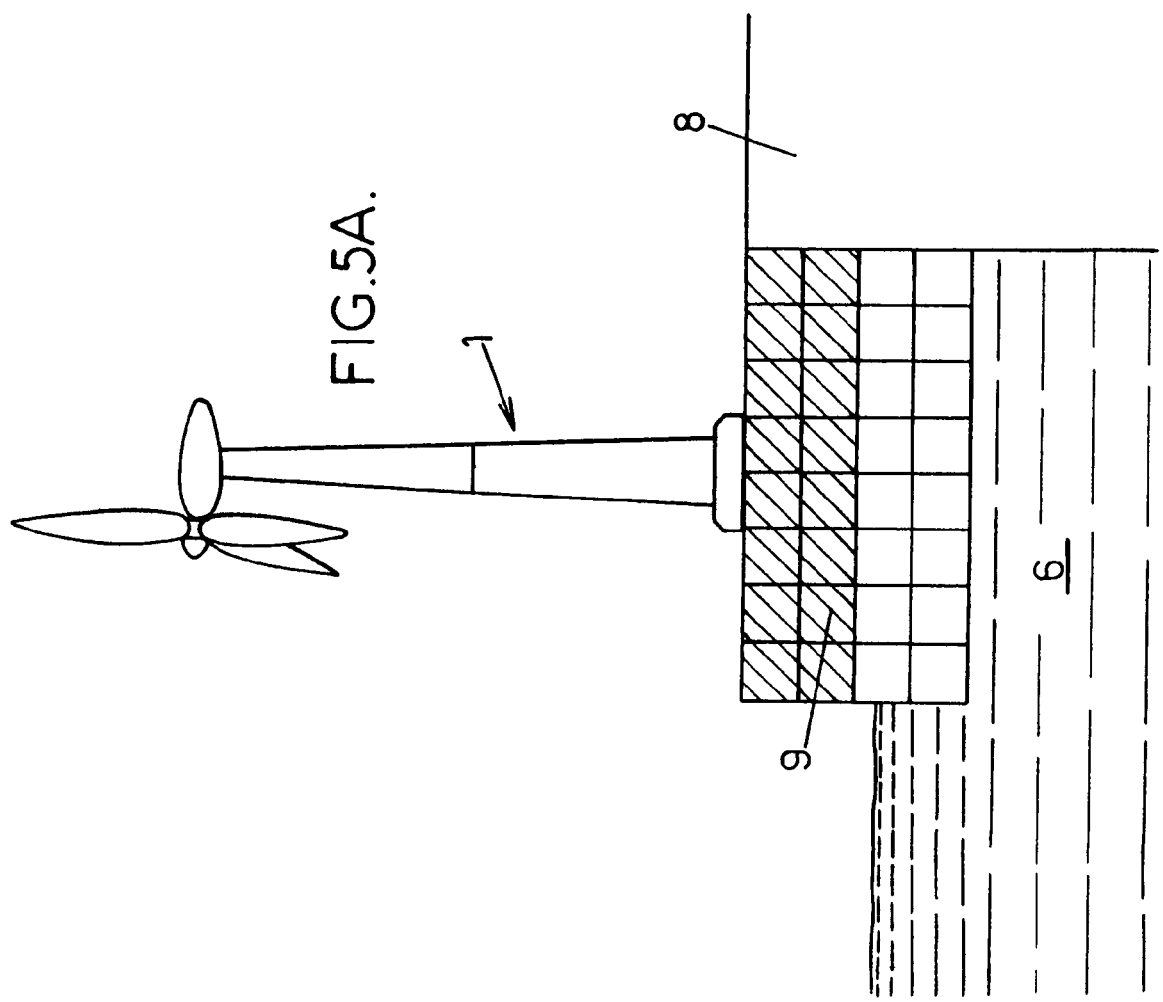

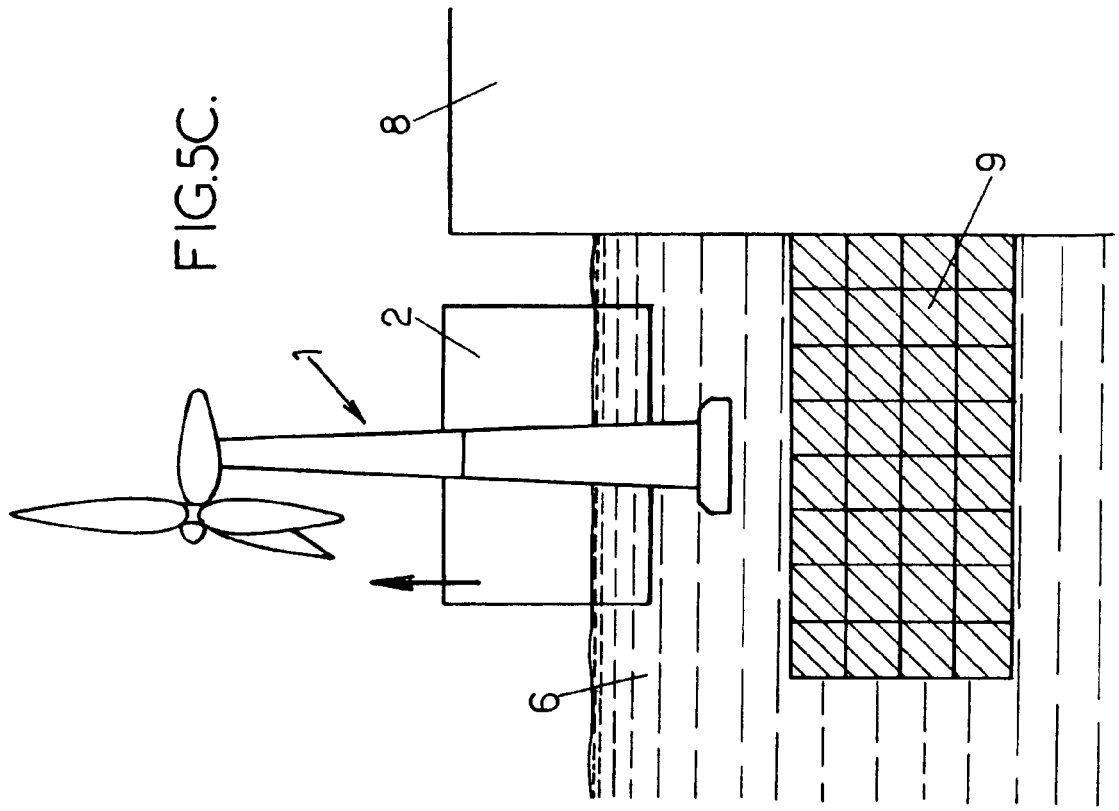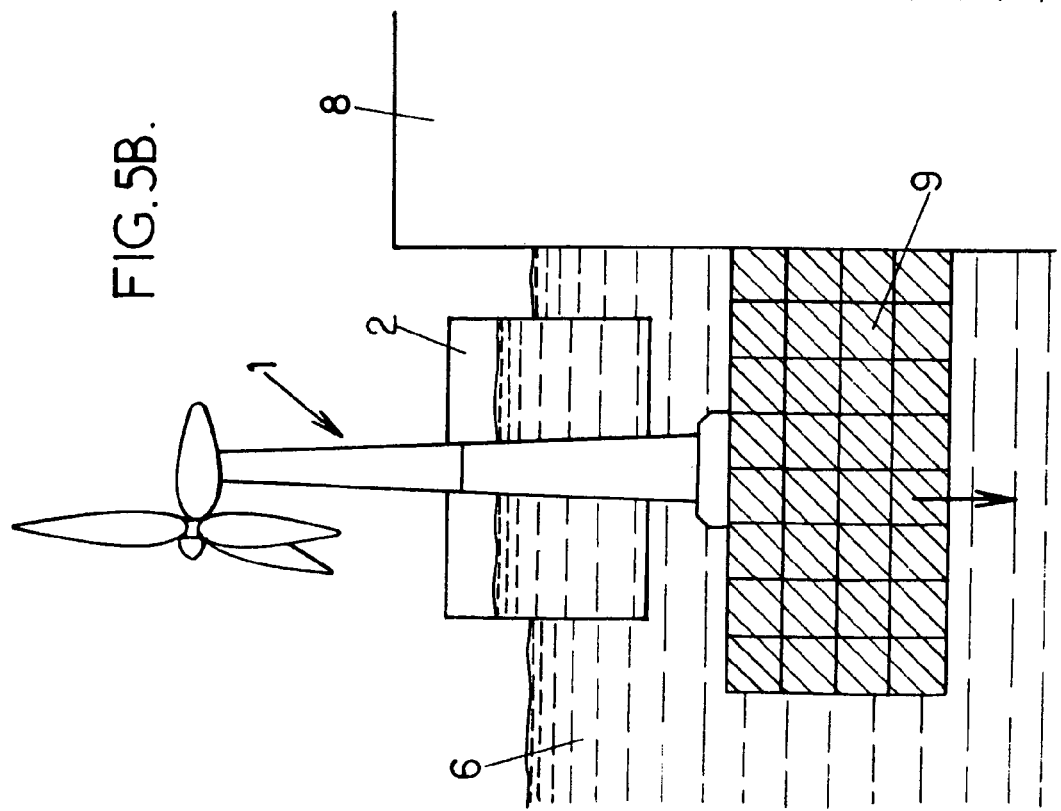

METHOD FOR THE TRANSPORT OF A CIVIL ENGINEERING STRUCTURE IN AN AQUATIC MEDIUM

BACKGROUND OF THE INVENTION

This application claims priority to French Patent Application No. 07 07881 filed on Nov. 9, 2007, which is hereby incorporated by reference in its entirety.

This invention relates to the transport of a civil engineering structure in an aquatic medium. Other aspects of the invention will relate to launching and/or installation of the civil engineering structure in an aquatic medium.

For reasons of simplicity it is common practice not to transport finished civil engineering structures by sea, but separate components which will then be assembled at sea.

By way of example, the construction of an offshore wind generator, that is to say one which is intended to be located in the open sea, conventionally takes place in the following way—the base and possibly the metal drum of the wind generator are constructed onshore, they are transported to sea holding them by means of a crane located on a barge, and then once at sea the hub and the blades forming the rotor of the wind generator are positioned on the base and/or metal drum.

However the work required at sea to assemble the various components of the civil engineering structure is relatively long, complex and costly. Its level of safety is also sometimes less than that of work carried out onshore.

Even if the transport of a finished civil engineering structure by sea were to be envisaged, for example by placing it entirely on a boat or on a barge, complex work at sea would still be necessary to install the civil engineering structure in its permanent position.

By way of example, if a wind generator were to be transported lying on a barge, its installation at sea would require it to be raised by means of a crane and erected so that it could be placed vertically in its permanent position.

One object of this invention is to overcome these disadvantages.

SUMMARY OF THE INVENTION

The invention thus provides a method for the transport of a civil engineering structure in an aquatic medium. This method comprises the following steps:

associating at least one float with the civil engineering structure, to ensure that the said civil engineering structure floats stably in an aquatic medium, the said float surrounding the civil engineering structure and a bottom portion of the civil engineering structure extending below the said float, and causing the civil engineering structure and the associated float to travel to a desired position in the aquatic medium.

Stable floating of the civil engineering structure renders it particularly simple to transport.

This method of transport also makes it possible to simplify subsequent installation of the civil engineering structure. It is sufficient to bring the civil engineering structure immediately above its final position, and then to reduce its buoyancy, which has the effect of causing the civil engineering structure to descend within the aquatic medium, possibly until its base comes into contact with the floor of the aquatic medium.

The complex work at sea required for the transport and/or installation of the civil engineering structure can thus be reduced, or even eliminated.

According to advantageous embodiments which may be combined in any foreseeable manner:

the method further comprises a step of separating the civil engineering structure and the associated float when the civil engineering structure and the associated float have reached the said desired position, the method also comprises a step of descent of the civil engineering structure and the associated float in the aquatic medium when the civil engineering structure and the associated float have reached the said desired position, descent of the civil engineering structure and the associated float in the aquatic medium is brought about at least partly by ballasting the said float, the float is substantially monolithic, the float has a substantially U-, C- or enclosing shape, the association of at least one float with the civil engineering structure comprises the fact that the civil engineering structure is gripped through the use of two barges, the civil engineering structure is placed on a lift and introduced into the aquatic medium by lowering the lift in the aquatic medium; this step advantageously precedes association of the float with the civil engineering structure, but may as a variant follow that association, the civil engineering structure is carried on the lift from an onshore location adjacent to the aquatic medium, the civil engineering structure is slid onto the lift, sliding is ensured by means of a fluid cushion system, the force exerted on the lift by the civil engineering structure is compensated for as the civil engineering structure is moved onto the lift, compensation for the force is achieved at least partly by progressive variation of the distribution of water in the lift, the lift incorporates a plurality of caissons and the progressive variation in the distribution of water in the lift comprises varying the level of water in at least some of the said caissons, descent of the lift into the aquatic medium is brought about by placing water within the lift, the float is associated with the civil engineering structure in an area of the aquatic medium above which the civil engineering structure is initially lifted, the civil engineering structure is initially lifted by means of lifting means of the load-bearing structure, the load-bearing structure takes the form of a portal located on land, straddling the said area of the aquatic medium, a slab is located so as to close off or separate the said area of the aquatic medium by being pushed, the civil engineering structure has a height which is greater than the dimensions of its base, and/or the civil engineering structure is an offshore wind generator.

Other features and advantages of this invention will appear from the following description of non-restrictive embodiments with reference to the appended drawings.

BRIEF DESCRIPTION OF THE DRAWINGS

FIG. 4 is a diagram illustrating the positioning of the wind generator on a lift, FIGS. 5A, 5B and 5C are diagrams illustrating the descent of the wind generator into the sea with the help of a lift, the addition of a float, and then the floating of the wind generator and the associated float by deballasting the float.

DESCRIPTION OF PREFERRED EMBODIMENTS

An aim of the invention is to transport a civil engineering structure in an aquatic medium, for example at sea. Other aspects of the invention relate to the launching and/or installation of the civil engineering structure in an aquatic medium.

The civil engineering structure in question may be any type of gravity structure. Advantageously its height is greater than the dimensions of its base. It may for example be an offshore wind generator, that is to say a wind generator which is designed to be located in the open sea.

The non-restrictive embodiment of an offshore wind generator is more particularly considered below purely for illustrative purposes.

Figure 1:
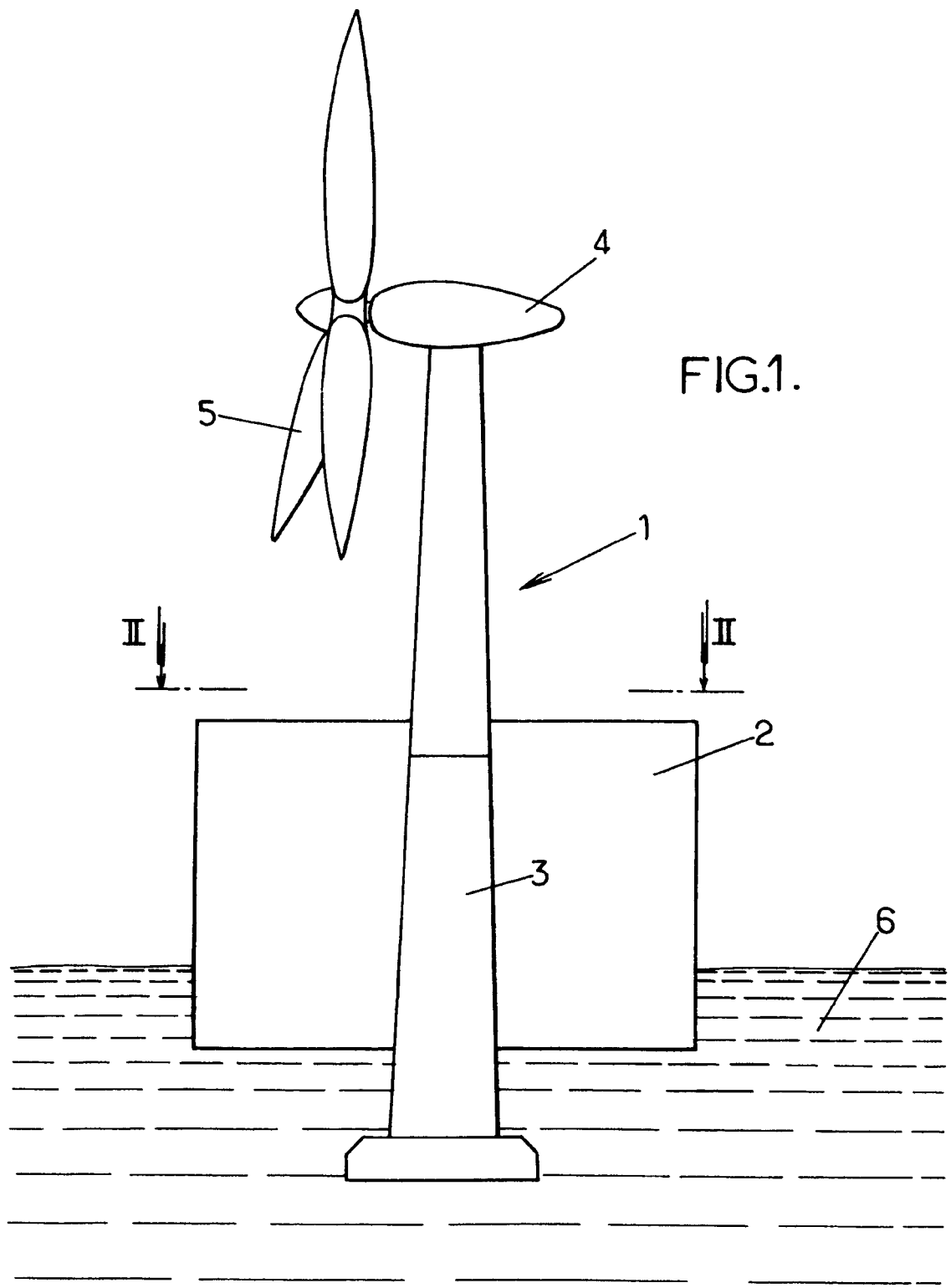
FIG. 1 is a profile view of a wind generator and a pair of associated barges floating stably on the sea, partly in longitudinal cross-section along I-I in the direction of its height.
Figure 2:
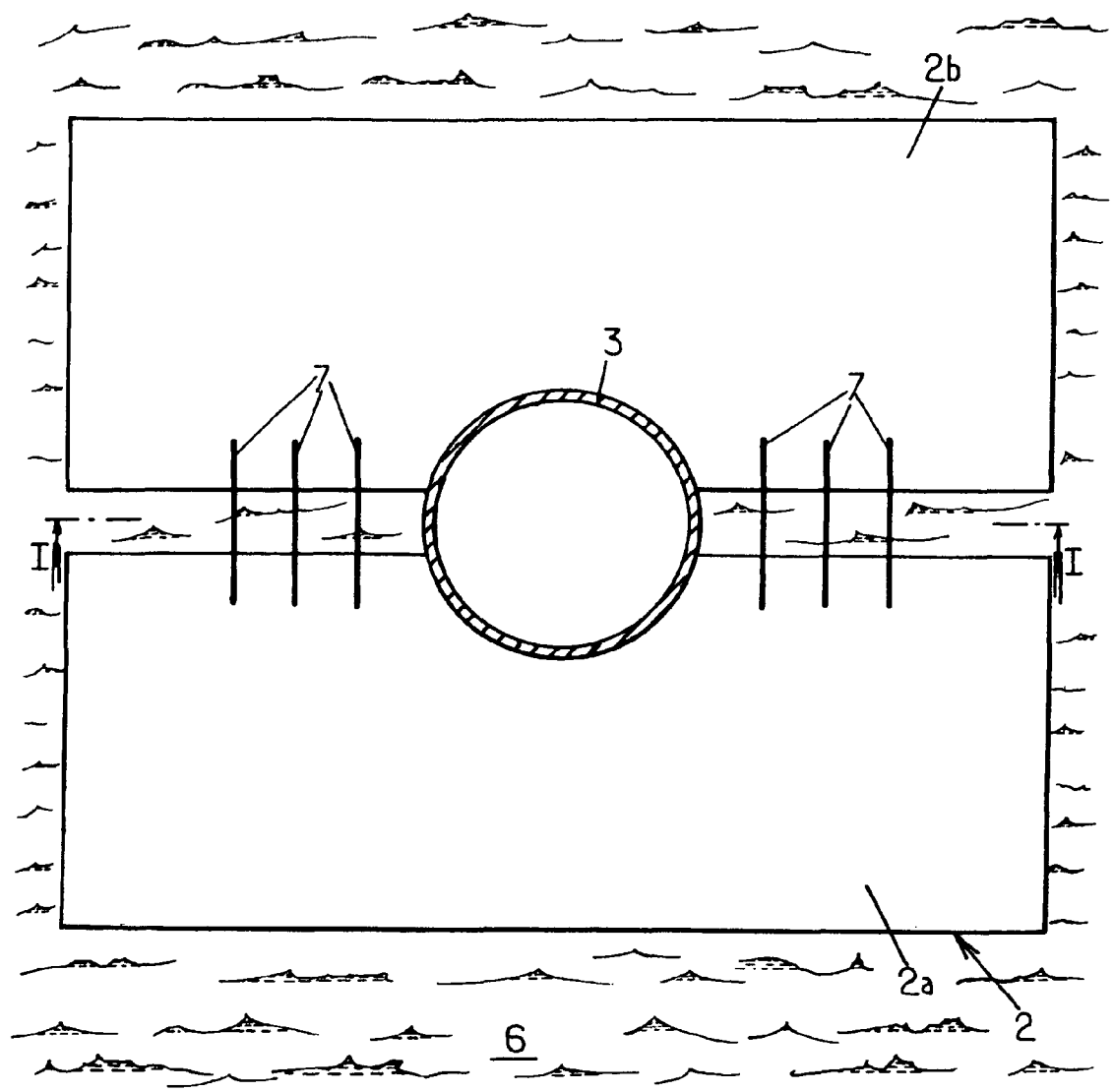
FIG. 2 is a view from above, in cross-section along II-II, of the wind generator and the pair of associated barges in FIG. 1, FIGS. 3A and 3B are diagrams illustrating the descent of the wind generator into the sea and the pair of associated barges.

As shown in FIGS. 1 and 2, a float 2 is associated with a wind generator 1 comprising a lower portion 3 including a base and possibly a metal drum, surmounted by a nacelle 4 incorporating a hub bearing the blades of a rotor 5, to ensure that the wind generator floats stably in the sea. This association may possibly be reversible, such that float 2 and wind generator 1 can be subsequently separated if necessary.

In the example illustrated float 2 surrounding wind generator 1 in fact comprises two transport barges 2a and 2b which grip base 3 of the wind generator.

These two barges are advantageously attached to each other. As a variant each of the barges could be attached to one side of wind generator 1. In both cases they may be attached by any appropriate type of means 7. This may for example be provided by means of prestressing, by a shear key, by axial pins or by any other type of assembly, alone or in combination.

Barges 2a and 2b are dimensioned and positioned in such a way as to ensure that wind generator 1 floats stably during all steps of transport. For this purpose it may be advantageous that they are located at least partly above the centre of gravity of wind generator 1 in order to prevent the latter from overturning.

If wind generator 1 has some ability to float, barges 2a and 2b will then have the main role of stabilising wind generator 1 for the purposes of transport, for example in a substantially vertical position. If on the other hand wind generator 1 has a density such that it is not able to float sufficiently well by itself, then barges 2a and 2b will further improve the buoyancy of wind generator 1.

Barges 2a and 2b may advantageously be designed to be ballastable and deballastable so as to ensure that wind generator 1 floats and is stable at all steps during transport.

In addition to this, a bottom portion of wind generator 1 extends below barges 2a and 2b. Through this arrangement the wind generator may be set down in the sea and placed in direct contact with the bed.

Of course one or more floats other than a pair of barges may be used. A monolithic float may for example be placed around wind generator 1. As a variant, a plurality of floats surrounding wind generator 1 may be envisaged. The floats do not necessarily have to be in direct contact with wind generator 1.

It will be further noted that the shapes of float used may be matched to the profile of the civil engineering structure which has to be transported. In the case of a monolithic float for example a U-shape, a C-shape or an enclosing or surrounding shape may be envisaged.

As illustrated in FIGS. 1 and 2, wind generator 1 and associated barges 2a and 2b are placed in an aquatic medium, for example in the sea 6. The at least partial introduction of wind generator 1 into sea 6 precedes its association with barges 2a and 2b. However it is not ruled out that wind generator 1 and barges 2a and 2b should be associated before they are placed in the water.

As a result of this association of wind generator 1 and barges 2a and 2b the assembly floats stably on sea 6. It can then be caused to move easily in the sea to a desired position. This may be carried out in any envisageable manner. For example, the assembly comprising wind generator 1 and barges 2a and 2b may be pulled by a tug.

The desired position to which wind generator 1 and barges 2a and 2b are taken advantageously corresponds to a location where wind generator 1 has to be installed. This location is for example on the vertical from the point on the sea bed where the wind generator has to rest.

Figure 3A:
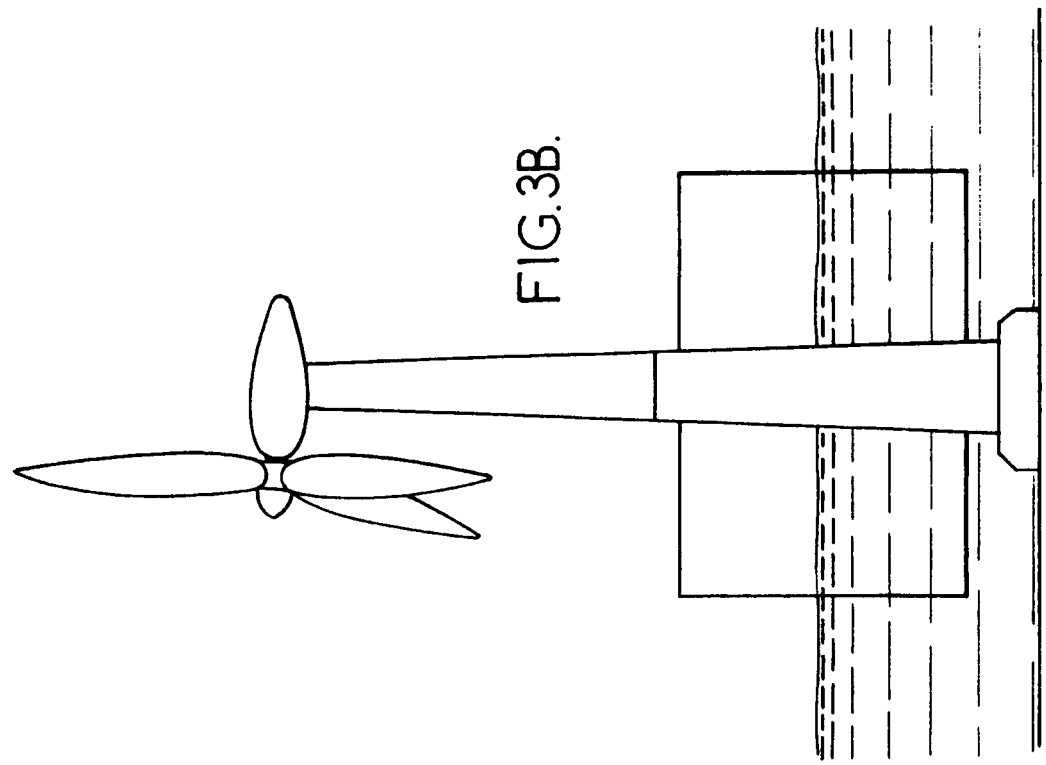
Figure 3B:
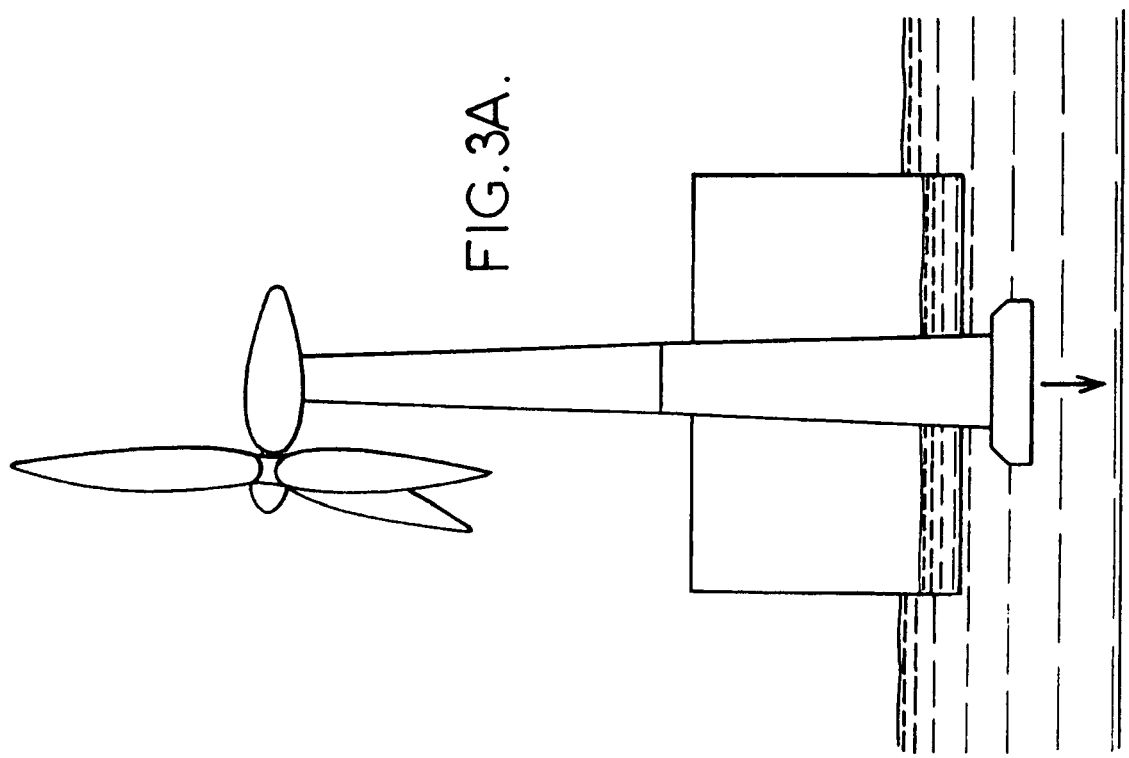

Wind generator 1 may be lowered in the sea at least partly by ballasting barges 2a and 2b, as illustrated in FIGS. 3A and 3B. In this way the barges are permanently connected to wind generator 1. However, because of the fact that the bottom portion of the wind generator extends below the barges, wind generator 1 may nevertheless enter into direct contact with the sea bed if it descends sufficiently far.

This mechanism may be particularly useful in the case where the buoyancy of wind generator 1 is too great and prevents wind generator 1 from reaching the sea bed by itself. The ballasting of barges 2a and 2b in fact weights wind generator 1 and thus helps its descent into the sea. This mechanism may also be used even when attachment means 7 are not separable. Conversely, if possible, it may be envisaged that barges 2a and 2b are separated from wind generator 1 once the latter has reached its final position on the sea bed, in such a way that the barges can be subsequently reused.

Barges 2a and 2b may for example be ballasted by filling caissons incorporated in those barges using pumps. Preferably it will be ensured that the ballasting of barges 2a and 2b is synchronised in order to continue to ensure the stability of wind generator 1 as it descends.

If the constitution of wind generator 1 permits it, it may also be lowered into the sea by ballasting the wind generator itself, as a replacement for or supplementing barges 2a and 2b.

As a variant, the wind generator may be installed by separating barges 2a and 2b from wind generator 1 while the latter is still afloat. This separation may be brought about for example by detaching attachment means 7 which attach the barges together, or, if appropriate, the attachment means connecting them to wind generator 1. As wind generator 1 is no longer held by the barges, it then sinks into the sea.

Of course in the situation where other types of float are used to float a civil engineering structure, separation between that float and the structure will take place in an appropriate way, for example by carrying out operations in a reverse manner to those which made it possible to associate the float and the structure.

FIGS. 5A and 5B illustrate an advantageous embodiment for the introduction of wind generator 1 into the sea. This uses a lift 9 on which wind generator 1 is placed.

Initially lift 9 is located at a particular height which is for example above the level of sea 6 (FIG. 5A). This height may correspond to that of an onshore surface 8, for example a quay, adjacent to sea 6. This surface may for example be or communicate with that on which wind generator 1 was partly or wholly constructed.

Lift 9 is then lowered into sea 6, causing wind generator 1 to become progressively immersed in the water to a depth at which float 2 is associated with wind generator 1 (FIG. 5B).

The assembly comprising wind generator 1 and float 2 is then brought to a depth at which wind generator 1 will float stably. This may be achieved by deballasting previously ballasted float 2 (FIG. 5C) or by further lowering of lift 9, for example.

The lift may be of any kind. It may for example comprise an electrically and/or mechanically-controlled platform which moves along a vertical axis. It may possibly comprise a barge.

Advantageously, as illustrated in FIGS. 5A and 5B, the height of lift 9 may be adjusted by varying a quantity of water within it. Lift 9 can then descend into sea 6 by introducing seawater.

Lift 9, which may be in the form of a barge, may be provided with a plurality of caissons for this purpose. It may also be provided with pumps permitting ballasting by caisson.

Only part of these caissons will for example be filled with water when the lift is in its initial position (FIG. 5A, where the caissons filled with water are hatched). Progressive filling of the caissons will weight lift 9 causing it to descend in sea 6. At the end of its travel the lift will for example have all its caissons filled with seawater (FIG. 5B, in which the caissons filled with water are hatched). In this low position the lift may be placed on the sea bed or may float. Lift 9 may be vertically guided in order to minimise its surface area.

Wind generator 1 may be transferred from shore surface 8 to lift 9 by any means.

As illustrated diagrammatically in FIG. 4, this movement may be brought about by sliding. This sliding is advantageously brought about with the assistance of jackable means of lateral movement, such as a fluid cushion system. For this purpose wind generator 1 may rest on a supporting member with a fluid cushion 10 and may further be pushed towards the lift by any appropriate means. A fluid cushion system according to what is described in U.S. Pat. No. 4,538,699 may for example be used.

Figure 6:
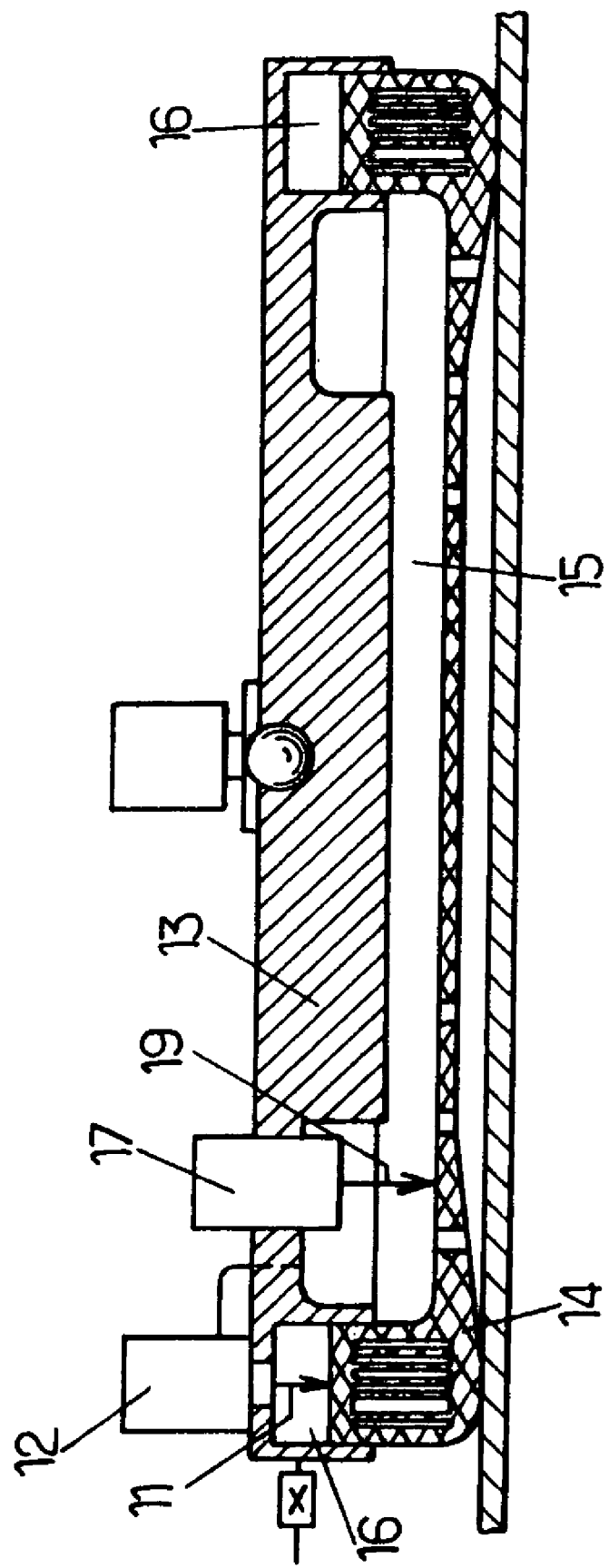
FIG. 6 is a diagram showing a non-restrictive embodiment of a fluid cushion system which can be used to move the wind generator.

FIG. 6 illustrates a fluid cushion of this type solely by way of example. The system comprises a fluid chamber 15 beneath a load-bearing platform 13, bounded in its marginal part by a flexible sealing member having an angular profile in the form of a sealing piston 14 whose lower horizontal limb is orientated towards the centre and whose vertical limb engages a pneumatic chamber 16 in such a way that it can slide vertically.

Pneumatic chamber 16 may communicate with fluid chamber 15 beneath load-bearing platform 13 through the intermediary of channels and a pressure regulating mechanism 12 in such a way that it may be subjected directly to the force of the fluid according to its pressure by virtue of the fact that the lower horizontal limb of sealing piston 14 is in contact with inlet valve 17 through a sensor 19, depending upon its elevation, which controls the delivery of fluid to fluid chamber 15 and a sensor 11 of pressure-regulating mechanism 12 opens into pneumatic chamber 16 and is in contact with the vertical limb of sealing piston 14 engaged in that chamber.

Of course other fluid cushion systems may also be appropriate.

When wind generator 1 progresses from onshore surface 8 to lift 9 it exerts a force on lift 9 which varies according to its progress. This force reflects the weight of wind generator 1 and the moment produced by the eccentricity of that weight in relation to the axis of lift 9, that is to say the vertical axis passing through the centre of gravity of a lift.

Thus, when for example at the start of its travel wind generator 1 rests entirely on the part of lift 9 closest to onshore surface 8, it may damage the lift or break it because of its weight.

Measures to compensate for the force may be applied to overcome this problem. The force exerted on lift 9 is thus compensated for as wind generator 1 advances. The necessary compensation over the course of time is advantageously calculated in real time.

This compensation may for example be carried out at least partly by means of progressive variation of the distribution of water in lift 9. When the latter comprises a plurality of caissons, as illustrated in FIG. 4, the level of water in at least some of the caissons can thus vary.

By way of illustration, FIG. 4 shows a state of the filling of the caissons of lift 9 when wind generator 1 begins to leave onshore surface 8 to move onto lift 9. This initial filling state has for example been achieved by ballasting lift 9, that is to say by individually filling particular caissons by means of pumps.

In this example it will be seen that filling of the caissons by water increases with distance from shore 8. In other words caissons 9b filled with water (hatched in FIG. 4) are more numerous away from shore 8, while caissons 9a which are empty of water are more numerous close to shore 8. This distribution makes it possible to compensate for the heavy load which acts mainly on the end of lift 9 in contact with shore 8.

Subsequently, as wind generator 1 advances onto lift 9, deballasting of the caissons may alter the level of water in at least some of the caissons. This deballasting may for example comprise the progressive emptying of some of caissons 9b furthest from shore 8.

This deballasting is advantageously carried out in order to satisfy the following two relationships over the course of time:

Moment associated with the Archimedes thrust+moment associated with the weight of wind generator 1 ≤ the tolerable imbalance moment  (1)

Shear force at the connection between shore 8 and lift 9 associated with ballasting+weight of wind generator 1 ≤ the tolerable shear force  (2).

The tolerable imbalance moment and the tolerable shear force mentioned in equations (1) and (2) correspond to values which ensure that lift 9 is securely associated with shore 8. They may advantageously be increased by means of a device anchoring lift 9 to shore 8. In this case when wind generator 1 reaches the centre of lift 9 these quantities will be advantageously cancelled out before the forces clamping lift 9 to shore 8 are released.

As an alternative to the use of a lift 9 by which wind generator 1 can be lowered into the sea, many other embodiments may also be envisaged within the context of this invention.

Figure 7:
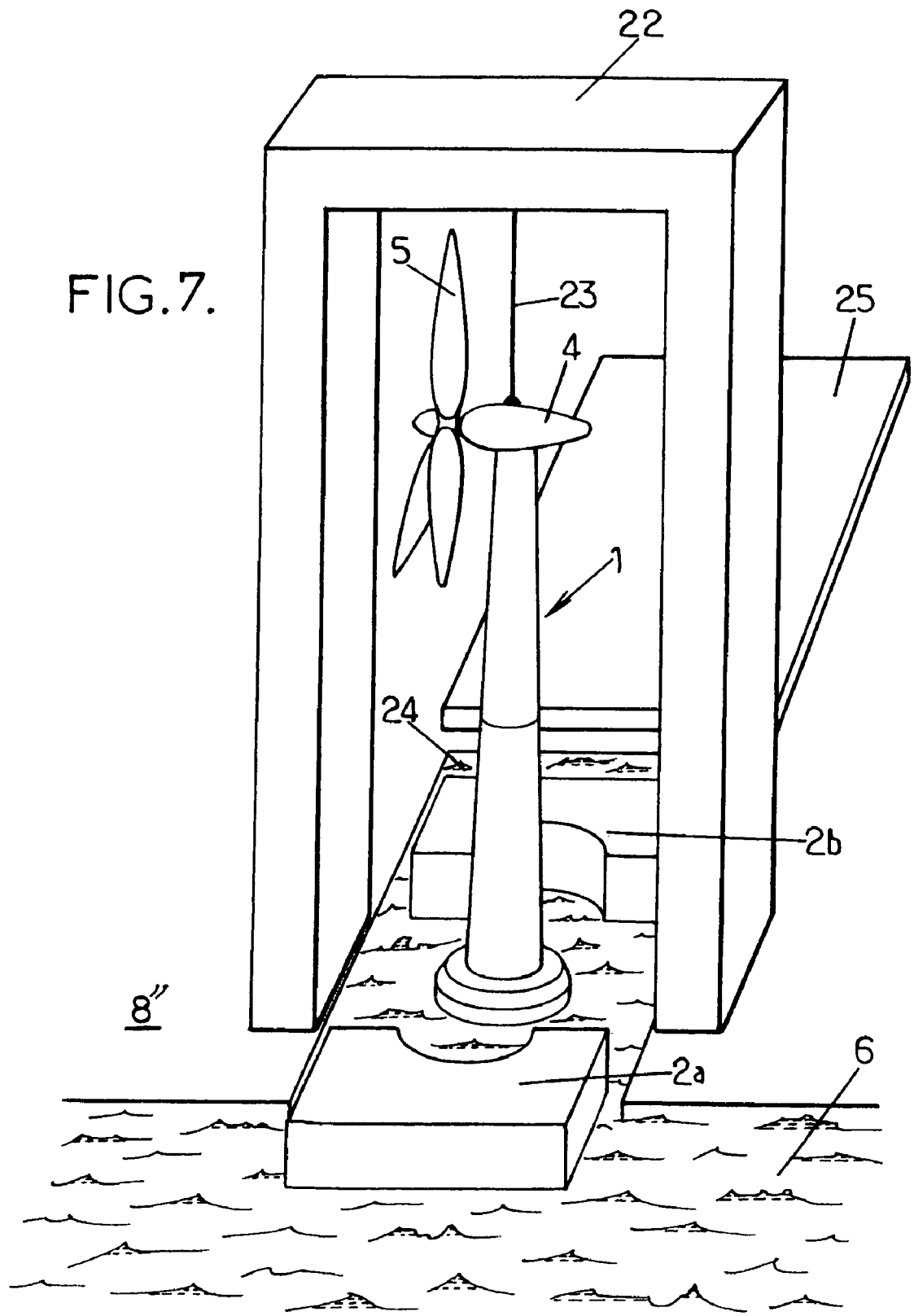
FIG. 7 is a diagram illustrating a situation in which a float is associated with the wind generator in an area of the aquatic medium above which the wind generator is initially lifted.

FIG. 7 illustrates yet another embodiment for placing the wind generator in the water, after it has been manufactured on shore 8". This makes use of an assembly portal 22 comprising lifting means 23.

Portal 22 is located in an area which is accessible from the sea. In the example illustrated in FIG. 7, portal 22 is located at the edge of shore 8" adjacent to sea 6. Sea 6 also penetrates within shore 8" in an area 24 located beneath portal 22. In other words, portal 22 is located on shore 8" straddling area 24.

This area 24 of sea 6 may for example be closed off by pushing a slab 25 over it. Wind generator 1 may thus rest on that slab in the course of its construction, or merely with a view to being placed in the sea.

In order to be placed in the water wind generator 1 is lifted by lifting means 23 of portal 22. The slab is pushed into the open position to open up area 24. A transport float, for example a pair of barges 2a and 2b, is introduced beneath portal 22. Wind generator 1 is then caused to descend again through lifting means 23 of portal 22 and penetrates area 24 where it is associated with barges 2a and 2b. Wind generator 1 is finally released from lifting means 23, as a result of which it can be introduced into sea 6 until it floats stably.

The use of a portal has been more particularly described above. It will however be understood that any load-bearing structure capable of lifting wind generator 1 could be suitable.

Of course other means for placing wind generator 1 in the water, for example by combination of the embodiments described above, may be used within the context of this invention.

Furthermore, although the invention has been described in the case of a wind generator, it will be understood that it can also apply to any other civil engineering structure. In this case the means and the steps used described above may have to be adapted as a consequence within the scope of this invention, as will be clearly apparent to a person skilled in the art.

Through the invention any civil engineering structure may be delivered to its final position in an aquatic medium, in a simple way. This delivery will advantageously relate to civil engineering structures which have been completely finished. It will nevertheless be understood that an unfinished civil engineering structure could be transported according to the invention, with one or more components then being attached to the structure in its permanent position.

The invention claimed is:

1. A method for the transport of a civil engineering structure in an aquatic medium comprising the following steps:
    associating at least one float with the civil engineering structure to ensure that the civil engineering structure floats stably in the aquatic medium, wherein:
        the float surrounds the civil engineering structure;
        a bottom portion of the civil engineering structure extends below the float; and
        the at least one float is associated with the civil engineering structure in an area of the aquatic medium above which the civil engineering structure is lifted, and
    causing the civil engineering structure and the associated float to move to a desired position in the aquatic medium.

2. The method according to claim 1, further comprising a step of separating the civil engineering structure and the associated float when the civil engineering structure and the associated float have reached the desired position.

3. The method according to claim 1, further comprising a step of lowering the civil engineering structure and the associated float into the aquatic medium when the civil engineering structure and the associated float have reached the desired position.

4. The method according to claim 3, in which lowering of the civil engineering structure and the associated float into the aquatic medium is achieved at least partly by ballasting the float.

5. The method according to claim 1, in which the float is substantially monolithic.

6. The method according to claim 5, in which the float has a substantially U-, C- or graving enclosing shape.

7. The method according to claim 1, in which the association of at least one float with the civil engineering structure comprises gripping the civil engineering structure between at least two barges.

8. The method according to claim 1, further comprising, prior to introducing the civil engineering structure into the aquatic medium,
    associating the civil engineering structure with a lift; and
    introducing the civil engineering structure into the aquatic medium by descent of the lift into the aquatic medium.

9. The method according to claim 8, in which the civil engineering structure is moved onto the lift from an onshore location that is adjacent to the aquatic medium.

10. The method according to claim 9, in which the civil engineering structure is moved onto the lift by sliding.

11. The method according to claim 10, in which the sliding is brought about by means of a fluid cushion system.

12. The method according to claim 9, in which a force exerted by the civil engineering structure on the lift as the civil engineering structure is moved onto the lift is compensated for.

13. The method according to claim 12, in which the force is compensated for at least partly by progressive variation in a distribution of water in the lift.

14. The method according to claim 13, in which the said lift incorporates a plurality of caissons and in which progressive variation of the distribution of water in the lift comprises a variation in the level of water in at least some of the caissons.

15. The method according to claim 8, in which the descent of the lift into the aquatic medium is brought about by introducing water into the lift.

16. The method according to claim 1, in which the civil engineering structure is lifted by means of a lifting means of a load-bearing structure.

17. The method according to claim 16, in which the load-bearing structure takes the form of a portal located on land straddling the area of the aquatic medium.

18. The method according to claim 1, in which a slab is arranged to close off or open up an area above the area of the aquatic medium by being pushed.

19. The method according to claim 1, in which the civil engineering structure has a height which is greater than the dimensions of its base.

20. The method according to claim 19, in which the civil engineering structure is an offshore wind generator.

* * * * *